United States Patent [19]

Iino

[11] Patent Number: 4,886,328

[45] Date of Patent: Dec. 12, 1989

[54] DISPLAY APPARATUS FOR VEHICLE WITH MEANS TO PREVENT SOLAR HEATING THEREOF

[75] Inventor: Tadashi Iino, Susono, Japan

[73] Assignee: Yazaki Corporation, Tokyo, Japan

[21] Appl. No.: 866,714

[22] Filed: May 27, 1986

[30] Foreign Application Priority Data

| Sep. 11, 1985 | [JP] | Japan | 60-138013[U] |
| Oct. 25, 1985 | [JP] | Japan | 60-162965[U] |
| Feb. 19, 1986 | [JP] | Japan | 61-21554[U] |
| Mar. 12, 1986 | [JP] | Japan | 61-34577[U] |
| Mar. 31, 1986 | [JP] | Japan | 61-46112[U] |

[51] Int. Cl.$^4$ ............................................. G09G 3/02
[52] U.S. Cl. ..................................... 340/980; 340/705; 350/174; 350/331 T; 353/14
[58] Field of Search ............... 340/971, 980, 97, 705, 340/793, 713, 714, 763, 796, 485, 461; 73/178 R; 353/13, 14, 11, 12, 52, 55, 57, 61, 88; 350/174, 171, 331 T, 331 R, 257, 283, 276 R, 277; 250/214 AL, 214 B, 201 R; 358/250, 109, 103

[56] References Cited

U.S. PATENT DOCUMENTS

| 3,180,981 | 4/1965 | Ulffers | 353/61 |
| 3,545,361 | 12/1970 | Brandt | 353/88 |
| 3,648,232 | 3/1972 | White | 340/971 |
| 3,709,589 | 1/1973 | Lamb et al. | 353/13 |
| 3,887,273 | 6/1975 | Griffiths | 350/174 |
| 3,892,474 | 7/1975 | Nilsson | 350/174 |
| 3,944,320 | 3/1976 | McLintic | 353/55 |
| 4,151,411 | 4/1979 | Derderian et al. | 350/407 |
| 4,190,832 | 2/1980 | Mohler | 340/705 |
| 4,222,641 | 9/1980 | Stolov | 353/88 |
| 4,338,600 | 7/1982 | Leach | 350/331 T |
| 4,447,128 | 5/1984 | Ferrer | 350/174 |
| 4,542,963 | 9/1985 | Linlor | 350/276 R |
| 4,560,239 | 12/1985 | Katz | 350/331 R |
| 4,623,222 | 11/1986 | Itoh et al. | 350/283 |
| 4,632,509 | 12/1986 | Ohmi et al. | 350/283 |
| 4,634,225 | 1/1987 | Haim et al. | 350/331 T |
| 4,635,033 | 1/1987 | Inukai et al. | 340/980 |
| 4,711,544 | 12/1987 | Iino et al. | 353/98 |
| 4,804,836 | 2/1989 | Iino | 340/705 |

FOREIGN PATENT DOCUMENTS 50-48576 5/1975 Japan .
2056740 3/1981 United Kingdom .

Primary Examiner—Joseph A. Orsino
Assistant Examiner—Brent Swarthout
Attorney, Agent, or Firm—Armstrong, Nikaido, Marmelstein, Kubovcik & Murray

[57] ABSTRACT

A display apparatus for a vehicle of the type wherein a display image of a display device located near a focus of an optical system is projected on a front glass of the vehicle so that a virtual image of the display image may be focused at a position forwardly of the front glass. In the display apparatus, when external light entering the optical system has an intensity higher than a predetermined level, a light intercepting means prevents the external light from being received by the display device, thereby preventing thermal destruction of the display device which may possibly be caused by heat given to the display device by intense external light such as the sunlight which is condensed by the optical system.

12 Claims, 6 Drawing Sheets

DISPLAY APPARATUS FOR VEHICLE WITH MEANS TO PREVENT SOLAR HEATING THEREOF

BACKGROUND OF THE INVENTION

This invention relates to a display apparatus for a vehicle which is installed on a vehicle such as an automobile, and more particularly to a display apparatus for a vehicle for displaying information relating to the vehicle such as a speed of the vehicle, a rotational frequency of an engine, a time and various cautions.

As a conventional apparatus of the type mentioned, for example, a display apparatus as illustrated in FIG. 1 is already known and disclosed in Japanese laid-open utility model No. 50-48576. In the known display apparatus, a projecting display unit is disposed inside an instrument panel $1b$ located in front of a handle $1a$ of a vehicle 1. The projecting display unit includes a lens, a display device disposed within a focus of the lens, and a casing accommodating the lens and the display device therein, which are all omitted in FIG. 1. A dash board $1c$ is located in front of the instrument panel $1b$, and a half mirror 2 having suitable transmission and reflection factors is located on the dash board $1c$ and in a suitable angular relationship to the optical axis of the lens. A display image displayed by the display device and representing information regarding the vehicle such as, for example, a speed of the vehicle, is projected on the half mirror 2 through an opening $1d$ formed in the dash board $1c$ so that a virtual image 3 is focused at a position spaced a predetermined distance forwardly of the half mirror 2.

Accordingly, a driver who sits on a driver's seat and is driving the vehicle can see the virtual image 3 in an overlapping relationship on an external field of vision of the driver, and hence can get information necessary for driving without taking his eyes off the external field of view, thereby assuring driving of the vehicle with safety.

By the way, a vehicle may be driven by various people who have different physical constitutions and habits. During driving, a view to see the outside is very different among drivers. Accordingly, the half mirror 2 is mounted for pivotal motion at a base end thereof on the dash board $1c$ so that a driver can suitably adjust the pivotal position of the half mirror 2 to move the virtual image 3 upwards and downwards to a suitable position adjusted to a view of a driver.

However, since the range of movement of the virtual image 3 is limited by the size of the half mirror 2, in order for the half mirror 2 to match with any driver, it is necessary for the half mirror 2 to have a large area.

Where the size of the half mirror 2 i large, most of the forward view of a driver will be obstructed by the half mirror 2, and the driver will see forwards through the half mirror 2. Although the driver can see through the half mirror 2, the half mirror 2 is apparently an obstacle to the forward view of the driver. Besides, the half mirror 2 makes designing of the instrument panel $1b$ difficult and is an obstacle to cleaning of the front glass $1e$ behind it. In addition, since the half mirror 2 is disposed to direct its upper edge toward a driver, it is a serious problem from a point of view of safety.

Therefore, the present applicant has proposed in patent application Ser. No. 850,126, now U.S. Pat. No. 4,711,544, a display apparatus for a vehicle which eliminates such problems of prior art apparatus as described above by constituting the same such that, as illustrated in FIG. 2, a display image is directly projected upon an inner surface of a front glass $1e$ of a vehicle from a projecting display unit not shown which is installed inside an instrument panel $1b$ so that a virtual image 3 of the display image may be focused at a position forwardly of the front glass $1e$.

According to the proposed apparatus, referring to FIG. 3, the projecting display unit designated at 4 includes a display device $4a$ constituted, for example, from a light transmissive liquid crystal display device including a liquid crystal display (LCD) cell $4a$-1 and a light source $4a$-2. The projecting display unit 4 further includes a convex lens $4b$ serving as an optical system for projecting a display image of the display device $4a$ to the front glass $1e$. The convex lens $4b$ is located at an opening $1d$ of a dash board $1c$ while the display device $4a$ is located adjacent a focal position F of the convex lens $4b$.

Accordingly, when the sun is directly above the vehicle 1 as shown in FIG. 4, the sunlight will pass through the front glass $1e$ and come directly to the optical axis of the convex lens $4b$ of the projecting display unit 4 without being obstructed by anything. The sunlight will then be condensed at the focus F of the convex lens $4b$ and irradiated upon the display device $4a$ located adjacent the focus F. In such a case, the LCD cell $4a$-1 of the display device $4a$ will be heated to a high temperature in a short period of time. Particularly when an intense ray of light such as the midsummer sunlight is received, the display device $4a$ will be thermally destructed readily.

A similar problem occurs to a display device which includes a light emitting diode, a fluorescent display tube and the like which are not originally made for use under the circumstance at a high temperature.

The present invention has been made to eliminate such problems as described above.

SUMMARY OF THE INVENTION

Accordingly, it is an object of the present invention to provide a display apparatus for a vehicle wherein a display device is prevented from being thermally destructed by an external ray of light which is irradiated to the optical axis of an optical system of the apparatus.

In order to attain the object, according to the present invention, a display apparatus for a vehicle comprises a display device for displaying information, an optical system for projecting a display image of said display device on a front glass of said vehicle, said optical system having a focus near which said display device is disposed, and light intercepting means for preventing external light entering through said optical system from the outside from being received by said display device through said optical system when the external light has an intensity higher than a predetermined level.

In the display apparatus for a vehicle according to the invention just described, when the intensity of incoming external light is higher than predetermined level, the light intercepting means prevents the external light from being received by the display device through the optical system. Accordingly, thermal destruction of the display device is prevented which may possibly be caused by heat given to the display device by intense external light such as the sunlight which is condensed by the optical system and is irradiated upon the display device located near the focus of the optical system.

DETAILED DESCRIPTION OF THE INVENTION

Now, the present invention will be described in connection with preferred embodiments thereof which are shown in the accompanying drawings.

Figure 1:
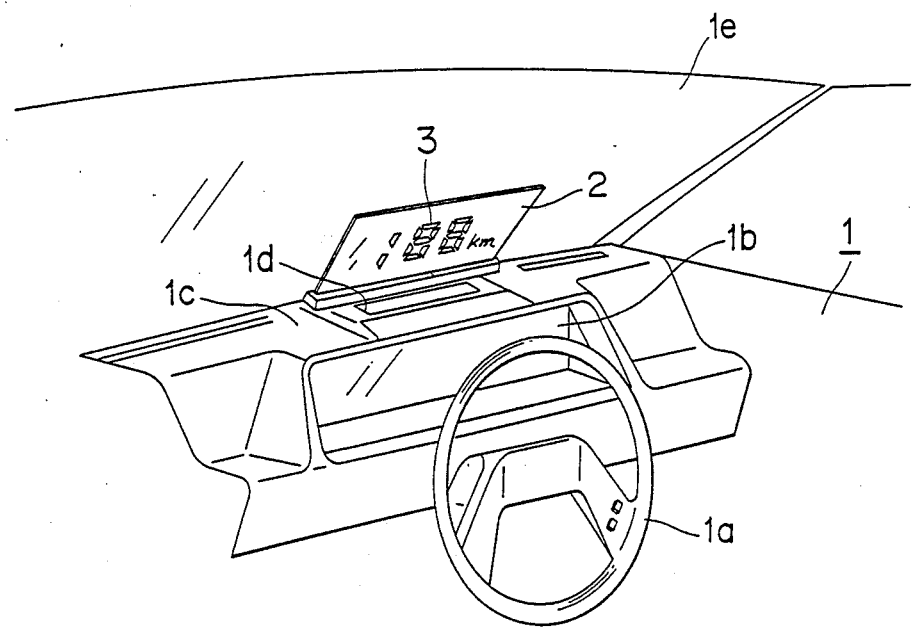
FIG. 1 is a perspective view showing an example of a conventional display apparatus for a vehicle.
Figure 2:
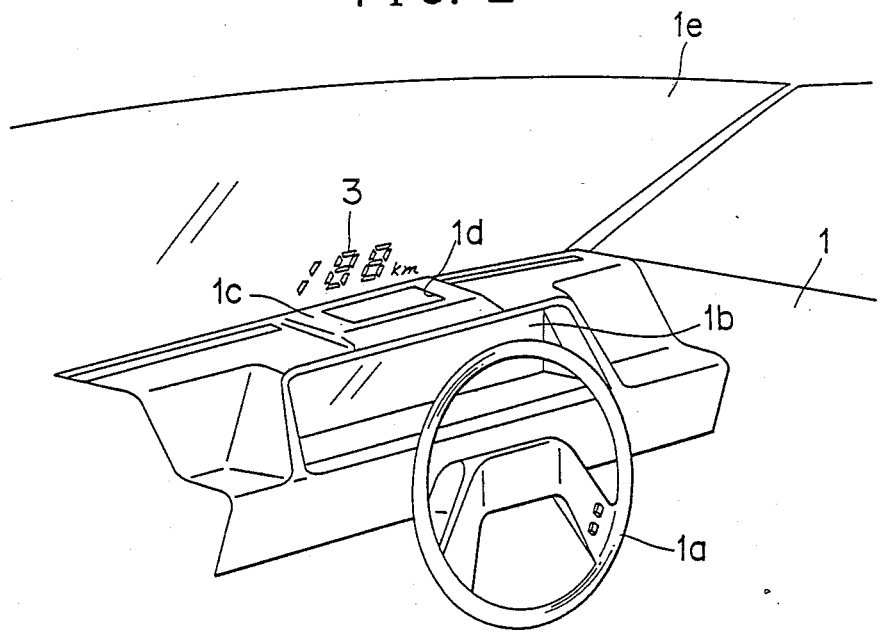
FIG. 2 is a similar view but showing an example of a display apparatus for a vehicle which has been proposed by the present applicant.
Figure 3:
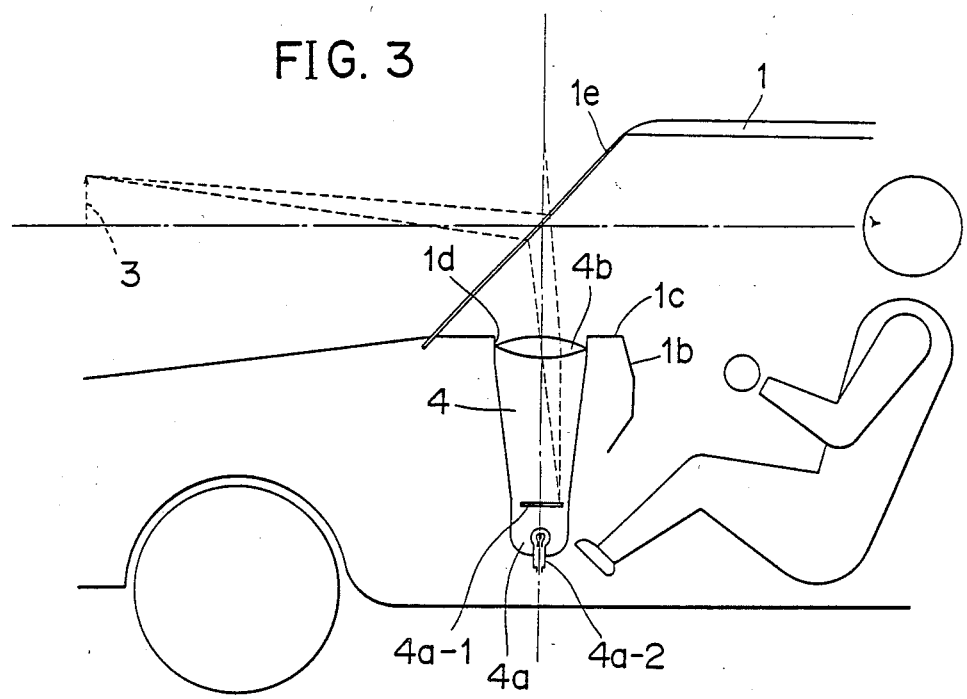
FIG. 3 is a side elevational schematic representation illustrating drawbacks of the apparatus of FIG. 2.
Figure 5:
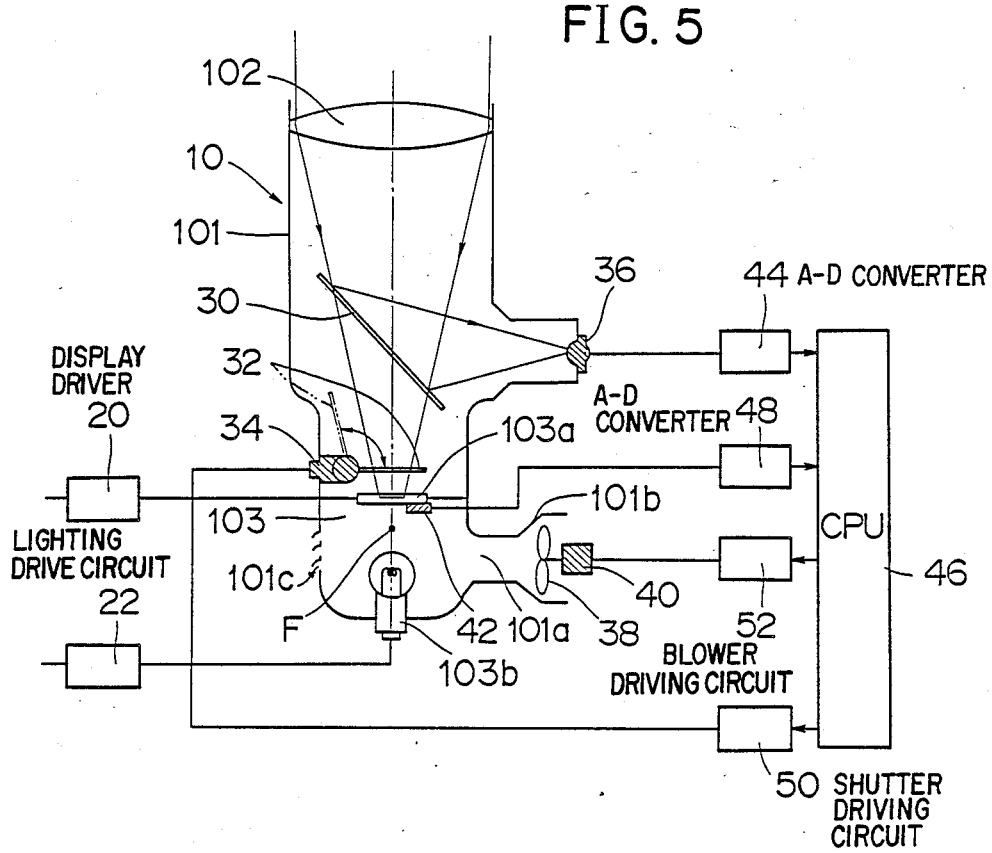
FIG. 5 is a cross sectional schematic representation, partly in block diagram, illustrating an embodiment of a display apparatus for a vehicle according to the present invention.
Figure 4:
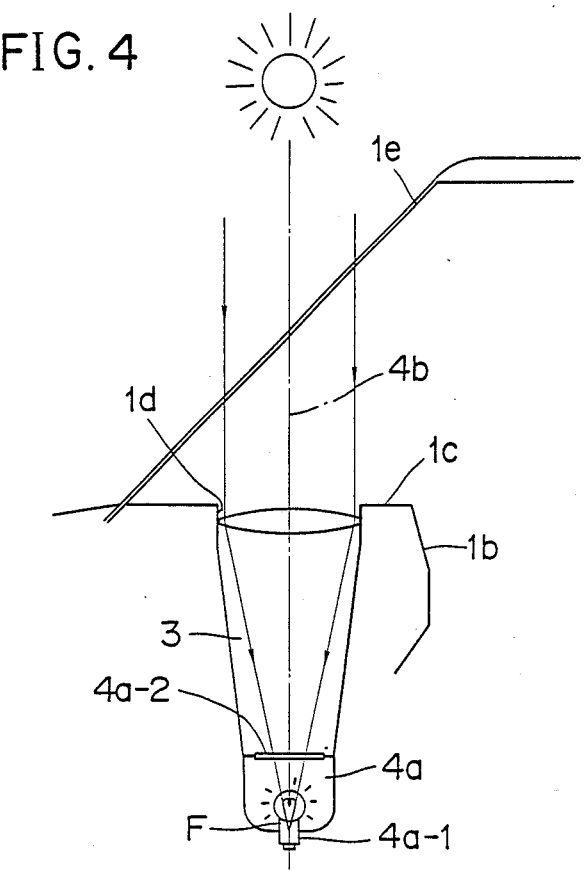
FIG. 4 is a side elevational schematic representation, in an enlarged scale, illustrating drawbacks of the apparatus of FIG. 2.

Referring first to FIG. 5 which illustrates a preferred embodiment of a display apparatus for a vehicle according to the present invention, a projecting display unit 10 includes a housing 101, a convex lens 102 located at an opening at an end of the housing 101 and serving as an optical system, and a display device 103 located on the bottom of the housing 101. The display device 103 is constituted as a liquid crystal display of the light transmissive type consisting of a liquid crystal display (LCD) cell 103a located within a length of a focus F of the convex lens 102, that is, a little displaced toward the convex lens 102 from the focus F of the convex lens 102, and a light source 103b in the form of a lamp for irradiating light to the LCD cell 103a from behind.

The LCD cell 103a is connected to be driven by a display driver 20 to form a display image representative of information regarding the vehicle such as, for example, a speed of the vehicle. The display image is either a negative or a positive image formed by light which is irradiated to the back of the LCD cell 103a from the light source 103b driven to be lit up by a lighting drive circuit 22 and is selectively transmitted or interrupted by the LCD cell 103a. The light passing through the LCD cell 103a in accordance with the display image is projected on a front glass not shown by way of the convex lens 102 so that a virtual image of the display image is focused at a position forwardly of the front glass.

Also located in the housing 101 are a half mirror 30 which is mounted in an inclined relationship by a predetermined angle to the optical axis of the convex lens 102 between the convex lens 102 and the display device 103, a shutter mechanism 32 which is located between the half mirror 30 and the display device 103, and a driving source 34 for shifting the shutter mechanism 32 between a first position in which it interrupts a path of light between the convex lens 102 and the display device 103 and a second position in which it does not interrupt the light path.

A light detecting element 36 which may be constituted, for example, from a phototransistor or a photodiode, is located at a position of a wall face of the housing 101 to which external light entering through the convex lens 102 and reflected by the half mirror 30 is condensed.

The half mirror 30 and the light detecting element 36 constitute an external light detecting means which in turn constitutes, together with the shutter mechanism 32 and the driving source 34, a light interrupting means.

A blast port 101a is formed at a portion of the wall of the housing 101 near the light source 103b, and a blast pipe 101b is formed in contiguous relationship to the blast port 101a of the housing 101. A blower 38 and an electric motor 40 for driving the blower 38 are accommodated in an end portion of the blast port 101a. A ventilating hole 101c is formed at a portion of the wall of the housing 101 opposing to the blast port 101a. A temperature detecting element 42 for detecting the temperature of the LCD cell 103a of the display device 103 is located at a surface of the LCD cell 103a facing the light source 103b.

The temperature detecting element 42, the blower 38 and the motor 40 constitute a thermally protective means for preventing the LCD cell 103d from being thermally destructed by the heat generated by the light source 103b.

The light detecting element 36 receives part of light entering from the outside through the convex lens 102 and reflected by the half mirror 30 and outputs an electric signal having a magnitude corresponding to the intensity of the external light. The electric signal outputted from the light detecting element 36 is converted into a digital signal by an analog to digital (A-D) converter 44 and then inputted as an external light data to a control circuit 46 which is constituted, for example, from a microcomputer (CPU). Meanwhile, the temperature detecting element 42 outputs an electric signal having a magnitude corresponding to a temperature at a surface of the LCD cell 103a. Also, the electric signal from the temperature detecting element 42 is converted into a digital signal by an A-D converter 48 and inputted as a temperature data to the control circuit 46.

The control circuit 46 determines depending upon an external light data provided by an electric signal from the light detecting element 36 if the intensity of the incoming external light is higher than a predetermined level or not, and controls the driving source 34 for the shutter mechanism 32 by way of a shutter driving circuit 50 in accordance with results of such determination. More particularly, the shutter mechanism 32 is normally at the closing or first position in which it interrupts the path of light. In this position, if the control circuit 46 determines from the external light data that external light having an intensity higher than the predetermined level is received, it does not render the driving source 34 operative via the shutter driving circuit 50 and maintains the shutter mechanism 32 in the original position. On the contrary, if the control circuit 46 determines that external light having an intensity higher than the predetermined level is not received, it renders the driving source 34 operative via the shutter driving circuit 50 to bring the shutter mechanism 32 to the second open position. Meanwhile, if the control circuit 46 determines that external light having an intensity higher than the predetermined level is received when the shutter mechanism 32 is in the open position, it renders the driving source 34 operative via the shutter driving circuit 50 to bring the shutter mechanism 32 from the open position to the closing position.

The control circuit 46 further detects, in response to a temperature data provided by an electric signal from the temperature detecting element 42, that the temperature of the LCD cell 103a has risen above a predetermined level, and renders the electric motor 40 for the blower 38 operative via a blower driving circuit 52. Meanwhile, when during operation of the electric motor 40 the temperature of the LCD cell 103a has lowered below another predetermined level lower than the predetermined level, the blower driving circuit 52 is controlled to stop operation of the electric motor 40.

In the construction described above, when the sunlight enters to the optical axis of the projecting display unit 10, part of the incoming light is reflected by the half mirror 30 and is condensed to the light detecting element 36. Thus, the light detecting element 36 outputs an electric signal in accordance with the intensity of the detected light. The electric signal from the light detecting element 36 is converted into a digital signal by the A-D converter 44 and is then inputted as an external light data to the control circuit 46.

Thus, the control circuit 46 determines depending upon the external light data received if the intensity of the external light is higher than a predetermined lever or not, and if a higher intensity than the predetermined level is detected, the control circuit 46 controls the driving circuit 50 to render the driving source 34 operative to bring the shutter mechanism 32 from the open to the closing position. Accordingly, even if intense light such as the sunlight is received, the external light is interrupted by the shutter mechanism 32 and hence cannot be irradiated or condensed to the LCD cell 103a located near the focus of the convex lens 102. Consequently, such thermal destruction of the LCD cell 103a can be prevented which may be caused by deterioration in performance due to irradiated heat of external light which will deteriorate the quality of a display image or worse disable formation of a display image.

Meanwhile, upon operation of the display device 103, the LCD cell 103a is heated by heat radiation from the light source 103b so that the temperature of the same is raised. The temperature detecting element 42 thus outputs an electric signal in accordance with the temperature of the LCD cell 103a, and the electric signal is converted into a digital signal by the A-D converter 48 and is then inputted as a temperature data to the control circuit 46.

Thus, the control circuit 46 determines depending upon the temperature data received if the temperature is higher than a predetermined level or not, and if a higher temperature than the predetermined level is detected, the control circuit 46 controls the blower driving circuit 52 to render the electric motor 40 operative. As a result, the blower 38 will feed a wind to the light source 103b to exhaust hot air through the ventilating holes 101c. Accordingly, temperature rise of the LCD cell 103a can be prevented.

Figure 6:
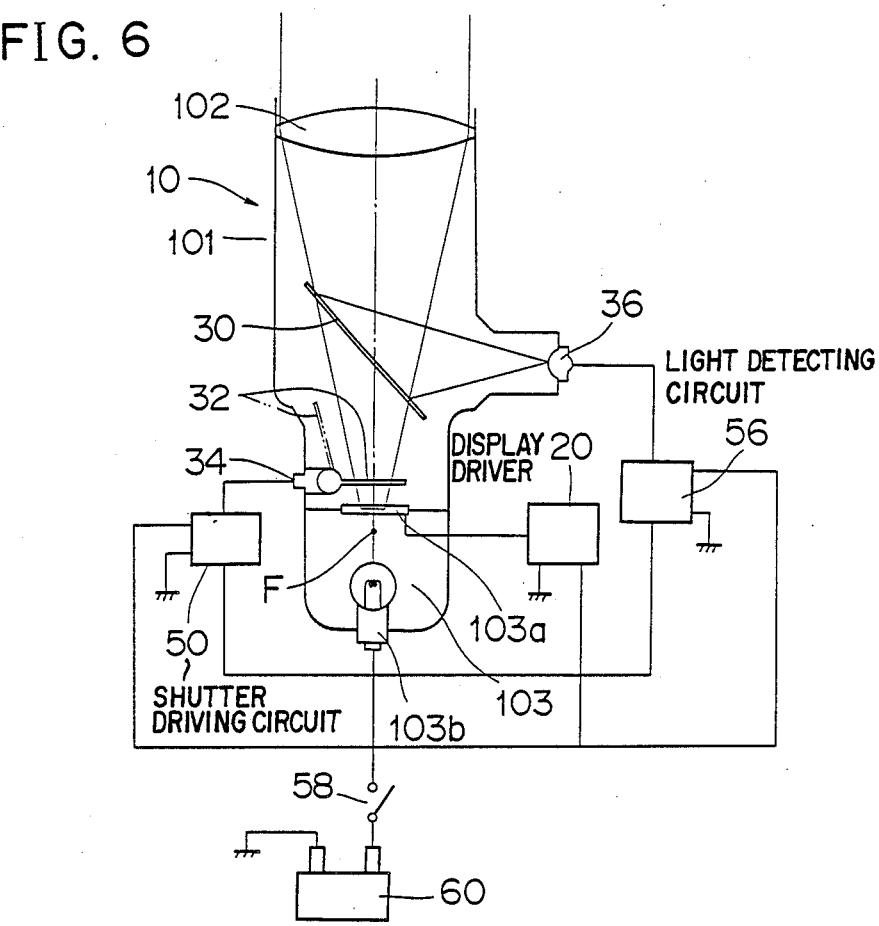
FIG. 6 is a similar view but illustrating another embodiment of the invention.

Referring now to FIG. 6 which illustrates another embodiment of a display apparatus for a vehicle according to the present invention, an external light detecting circuit 56 is provided in place of the control circuit 46 described above. The external light detecting circuit 56 detects depending upon an electric signal from a light detecting element 36 if the intensity of the external light is higher than a predetermined level or not, and controls a shutter driving circuit 50 in accordance with results of such detection. A light source 103b for a display device 103, a display driver 20 for driving an LCD cell 103a, the shutter driving circuit 50 and the external light detecting circuit 56 are connected to a battery 60 installed on the vehicle, for example, via an ignition switch or a switch 58 which is interlocked with such an ignition switch.

In the construction illustrated in FIG. 6, a shutter mechanism 32 is normally in a closing position as shown by full line in which it interrupts a path of light between the LCD cell 103a and a convex lens 102. In this position, if a switch 58 is turned on, the light source 103b, the display driver 20, the shutter driving circuit 5 and the light detecting circuit 56 are energized by the battery 60.

Consequently, the display driver 20 drives the LCD cell 103a in response to a signal from a circuit not shown in order that a display image representative of information regarding the vehicle may be displayed on the LCD cell 103a. The LCD cell 103a thus allows light from the light source 103b to pass therethrough in accordance with the display image for projection of the image. Meanwhile, the external light detecting circuit 56 receives an electric signal from the light detecting element 36 and detects from the electric signal if the intensity of the external light is higher than a predetermined level or not. If it is determined that the external light has an intensity lower than the predetermined level, the external light detecting circuit 56 couples a signal to the shutter driving circuit 50. The shutter driving circuit 50 thus drives the driving source 34 in response to the signal from the external light detecting circuit 56 to bring the shutter mechanism 32 from the closing position shown in full line 6 to the open position shown in phantom in FIG. 6. Accordingly, a display image formed by light which is emitted from the light source 103b and passes through the LCD cell 103a is projected on a front glass not shown by way of a convex lens 102.

Meanwhile, if the external light detecting circuit 56 detects external light having an intensity higher than the predetermined level from an electric signal from the light detecting element 36, no electric signal is delivered from the external light detecting circuit 56 to the shutter driving circuit 50. Accordingly, the driving source 34 is not driven by the shutter driving circuit 50, and hence the shutter mechanism 32 is held to the closing position as shown in full line in FIG. 6.

On the other hand, if the external light detecting circuit 56 detects external light having an intensity higher than a predetermined level when the shutter mechanism 32 is in the closing position, the signal which has been coupled from the external light detecting circuit 56 to the shutter driving circuit 50 now disappears so that the shutter mechanism 32 is no more driven by the shutter driving circuit 50 and hence brought from the open position as shown in phantom to the closing position as shown in full line in FIG. 6.

It is to be noted that since no components are energized by the battery 60 when a switch 58 is kept off, the display device 103 does not form a display image while the shutter mechanism 32 is held to the closing position.

Figure 7:
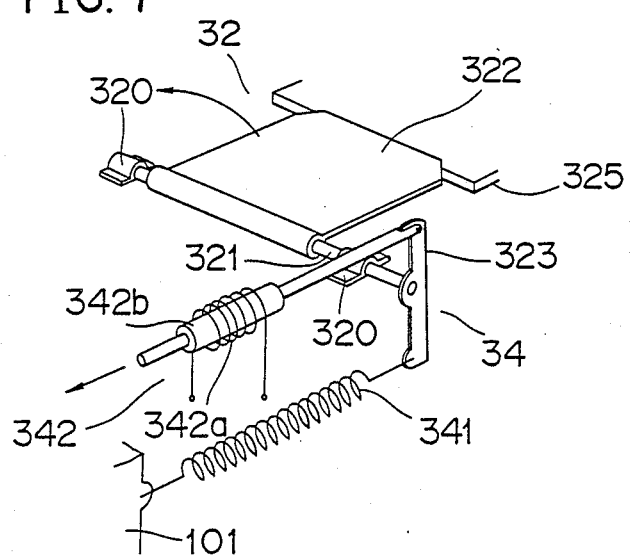
FIG. 7 is a perspective view showing an example of construction of part of the apparatus of FIG. 6.

Referring now to FIG. 7 which illustrates preferred embodiments of the shutter mechanism 32 and the driving source 34 shown in FIG. 6, the shutter mechanism 32 includes a shutter plate 322 secured to a rotary shaft 321 which is supported for rotation on a pair of bearings 320. A rockable arm 323 is secured at an intermediate portion thereof to an end of the rotary shaft 321.

The driving source 34 includes a tension spring 341 extending between an end of the arm 323 and a portion of the housing 101 and serving as a first driving source, and a solenoid 342 extending between the other end of the arm 323 and another portion of the housing 101 and serving as a second driving source. The tension spring 341 exerts a tensile force to resiliently urge the shutter plate 322 in a direction to a first position in which an end of the shutter plate 322 is abutted with a stopper 325. The first position of the shutter plate 322 is a closing position in which it interrupts a path of light between the convex lens 102 and the display device 103.

The solenoid 342 includes a solenoid coil 342a, and a moving-iron 342b having an end connected to the other end of the arm 323. When the solenoid coil 342a is energized, the moving-iron 342b is attracted to move in a direction of an arrow mark to pivot the arm 323 against the urging force of the spring 341 to pivotally displace the shutter plate 322 from the first to a second open position in which the shutter plate 322 does not interrupt the path of light between the convex lens 102 and the display device 103. If the solenoid coil 342a is deenergized, the attracting force to the moving-iron 342b disappears so that the arm 323 is pivotally displaced from the second to the first position by the urging force of the spring 342a thereby to interrupt the path of light between the convex lens 102 and the display device 103.

In the construction described above, when the solenoid coil 342a is not energized, the shutter plate 322 is held to the closing position shown in which it is abutted with the stopper 325 under the urging force of the tension spring 341, but when the solenoid coil 342a is energized, the moving-iron 342b is attracted to move in the direction of the arrow mark shown to pivot the shutter plate 322 to the open position.

The solenoid coil 342a is energized by the shutter plate drive circuit 50 in response to a signal received from the external light detecting circuit 56 when the external light detecting circuit 56 detects from an electric signal from the light detecting element 36 that the intensity of external light is not higher than a predetermined level while the switch 58 is held on so that the display device 103 is in its operative condition. However, either when the switch 58 is off or when the intensity of external light is higher than the predetermined level, the solenoid coil 342 is not energized at all. Accordingly, when the vehicle is stopped or parked and the switch 58 is off, or when the sunlight entering through the convex lens 102 and the intensity of external light is higher than the predetermined level, the shutter plate 322 is held to the closing position so that the LCD cell 103a will not at all be irradiated by the sunlight and hence is prevented from thermal destruction.

Figure 8:
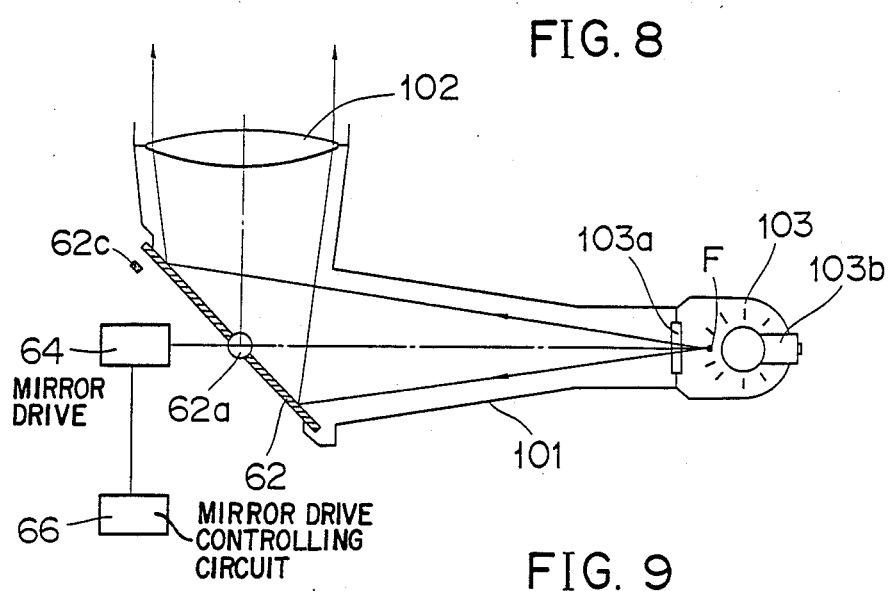
FIGS. 8 and 9 are cross sectional views, in an enlarged scale, illustrating different operative conditions of a modified form of part of the apparatus of FIG. 6.
Figure 9:
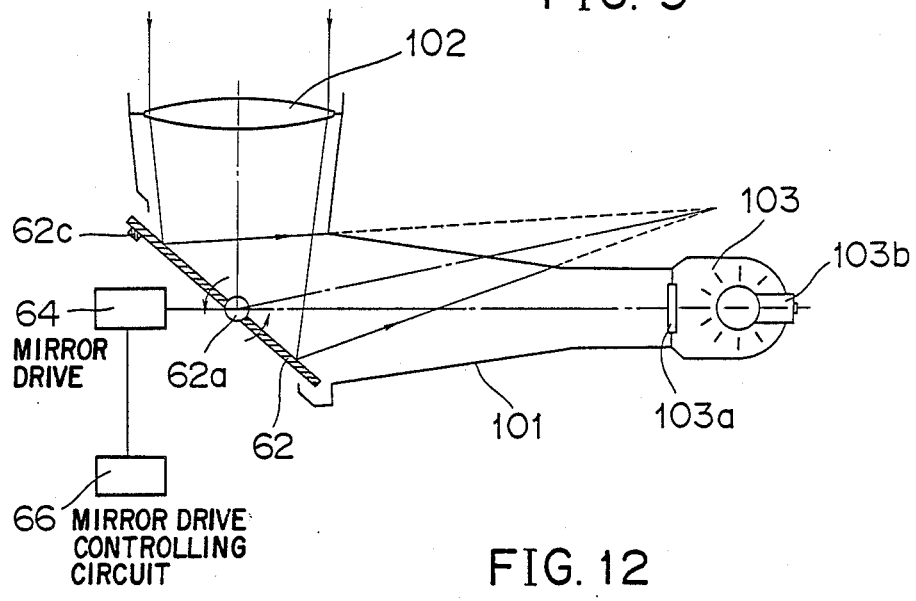
Figure 10:
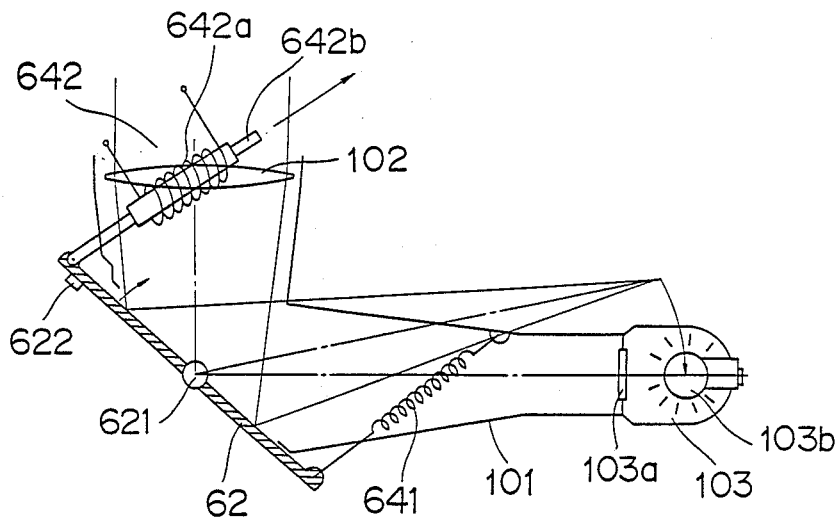
FIG. 10 is a perspective view illustrating an example of part of the apparatus of FIGS. 8 and 9.

FIGS. 8 to 10 illustrate another form of such light checking means for preventing external light having an intensity higher than a predetermined level from being received by the display device 103 to prevent thermal destruction of the display device 103. Referring to FIGS. 8 to 10, a reflecting mirror 62 is located between a convex lens 102 and a display device 103 and is supported at central portions of opposite ends thereof for pivotal motion by means of a pair of pivots 621. The reflecting mirror 62 is urged in a counterclockwise direction in FIGS. 8 to 10 by means of a tension spring 641 extending between an end of the reflecting mirror 62 and a portion of the housing 101 and serving as a first driving source and is normally held to a first position in which the other end thereof is abutted with a stopper 622. The other end of the reflecting mirror 62 is connected to a moving core 642b of a solenoid 642 serving as a second driving source so that when a solenoid coil 642a of the solenoid 642 is energized to attract the moving core 642b to move in a direction as indicated by an arrow mark, the reflecting mirror 62 is pivoted against the urging force of the spring 641 to a second position in which the other end of the reflecting mirror 62 is abutted with an outer wall of the housing 101.

In the first position of the reflecting mirror 62 as shown in FIG. 9, the reflecting mirror 62 directs the optical axis of the lens 102 away from the display device 103 so that external light entering through the convex lens 102 may be directed toward and reflected by an inner wall face of the housing 101. Meanwhile, in the second position of the reflecting mirror 62 as shown in FIG. 8, the reflecting mirror 62 directs the optical axis of the lens 102 to the display device 103 so that a display image of the display device 103 reflected by the reflecting mirror 62 may be projected to a front glass not shown through the convex lens 102.

The solenoid 642 is controlled by a mirror drive controlling circuit 66 including the light detecting element 36 and the external light detecting circuit 56 of the embodiment shown in FIG. 6. More particularly, when external light entering through the convex lens 102 having an intensity lower than a predetermined level, if the display device 003 is in its operative condition, the mirror drive controlling circuit 66 controls to energize the coil 642a of the solenoid 642 to attract the moving core 642b to move thereby to pivot the reflecting mirror 62 in the clockwise direction to the second position as shown in FIG. 8 against the urging force of the spring 641. Accordingly, a display image of the display device 103 is reflected by the reflecting mirror 62 and is projected through the convex lens 102.

Meanwhile, either when the display device 103 is not in its operative condition or when external light entering through the convex lens 102 has an intensity higher than the predetermined level, the mirror drive controlling circuit 66 does not control to energize the solenoid coil 642a of the solenoid 642. Accordingly, the reflecting mirror 62 is held to the first position as shown in FIG. 9 in which it is abutted with a stopper 62c under the urging of the spring 641 in the counterclockwise direction. Consequently, light entering through the convex lens 102 from the outside is not irradiated upon the display device 103 but reflected by an inner wall face of the housing 101.

In such a condition, even if the sunlight enters through the convex lens 102, the sunlight which is condensed by the convex lens 102 is not at all irradiated upon the LCD cell 103a of the display device 103. Instead, the sunlight reflected by the reflecting mirror 62 is irradiated upon an inner wall face of the housing 101. Since such an area of the inner wall face irradiated by the sunlight is large, if the housing 101 is made of a thermally resisting material, a problem of thermal destruction can be resolved easily.

Figure 11:
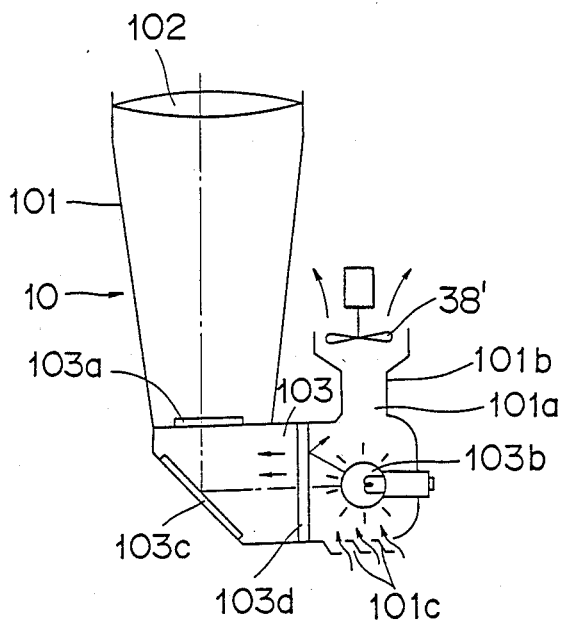
FIG. 11 is a cross sectional view illustrating a modified form of part of the apparatus of FIG. 5.

FIG. 11 illustrates a preferred form of such thermally protective means for preventing an LCD cell from being thermally destructed by heat generated by a light source in a projecting display unit which employs a liquid crystal display element of the light transmissive type. Referring to FIG. 11, a reflecting mirror 103c is located between an LCD cell 103a of a display device 103 and a light source 103b in such a relationship as to reflect light from the light source 103b toward a rear face of the LCD cell 103a. A member 103d in the form of a plate is located between the reflecting mirror 103c and the light source 103b and reflects a heat ray from the light source 103b while it transmits only a visible ray. The member 103d is what is called a hot mirror which is called a near infrared ray cut filter or a cold filter and is put on the market.

Ventilating holes 101c are formed at a bottom portion of the housing 101 near the light source 103b while an exhaust hole 101a is formed at a top portion of the housing 101. An exhaust pipe 101b is formed in contiguous relationship to the exhaust hole 101a, and an exhaust fan 38' is accommodated in an end of the exhaust pipe 101.

Figure 13:
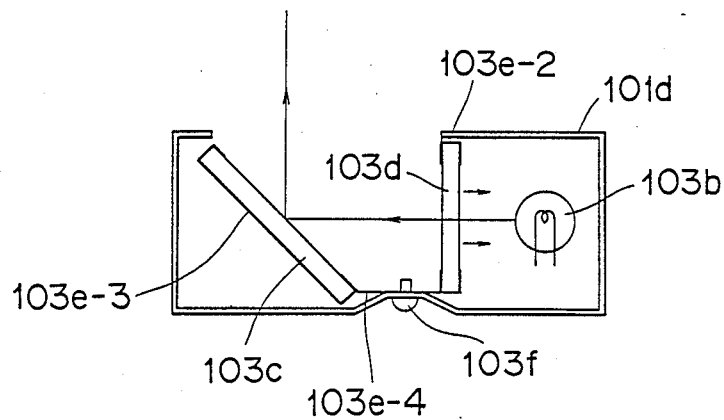
FIGS. 12 and 13 are enlarged cross sectional views showing details of part of the apparatus of FIG. 11.
Figure 12:
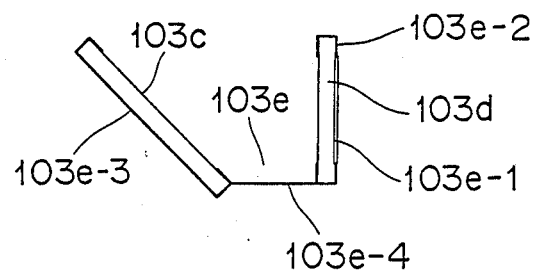

FIGS. 12 and 13 are enlarged views of the light source 103b, the reflecting mirror 103c and the member 103d. The reflecting mirror 103c acting as a member to reflect a visible ray and the member 103d which reflects only a heat ray and transmits a visible ray therethrough are secured to a single holder 103e which is formed as an integral member as seen in FIG. 12. The holder 103e has a vertical holding portion 103e-2 in the form of a framework having a window 103e-1 formed at the center thereof, an inclined holding portion 103e-3 in the form of a shallow box having a slope of about 45 degrees relative to the vertical holding portion 103e-2, and a connecting portion 103e-4 interconnecting the vertical and inclined holding portions 103e-2 and 103e-3. The member 103d is fittedly secured to the vertical holding portion 103e-2 while the reflecting mirror 103c is fittedly secured to the inclined holding portion 103e-3 of the holder 103e. The connecting portion 103e-4 of the holder 103e is securely fixed to a bottom face of a light source accommodating portion 101d of the housing 101 by means of a screw 103f.

In the construction described above, of light from the light source 103b including a visible ray and a heat ray, only the visible ray is allowed to pass through the member 103d. After then, the visible ray is reflected by the reflecting mirror 103c and is directed to the LCD cell 103a. The light entering the LCD cell 103a is transmitted in accordance with a display image of the LCD cell 103a and is then enlarged by the convex lens 102 whereafter it is projected on a face of a front glass.

Thus, a heat ray, that is, a near infrared ray, emitted from the light source 103b, is almost reflected and interrupted by the member 103d while only a visible ray is allowed to pass through the member 103d. Accordingly, there is no influence of heat on the LCD cell 103a located above the reflecting mirror 103c. Consequently, the performance of the LCD cell 103a is not deteriorated, and a display image of good discernibility can be obtained.

It is to be noted that the light source 103b is cooled because heat around the light source 103b is discharged outside the housing 101 from around the light source 103b by rotation of an exhaust fan 38' while at the same time air is sucked in through the ventilating holes 101c.

It is to be mentioned that while in the embodiments described a crystal liquid display element of the light transmissive type is employed for the display device, the present invention can be applied effectively also to any apparatus wherein a display image produced by an arbitrary display device constituted, for example, from a light emitting diode or a fluorescent display tube other than such a liquid crystal display element is projected on a front glass. In this case, there is not necessity of provision of a light source for illuminating the back of the display device, and hence there is no necessity of provision of thermally protective means.

What is claimed is:

1. A display apparatus for displaying a display image on a windshield of a vehicle, comprising:
    a display means for displaying information;
    converging lens means for projecting a display image of said display means on said windshield of said vehicle, said converging lens means having a focus within which said display means is located and being positioned between said windshield and said display device;
    light detecting means for detecting an intensity of external light entering through said converging lens means from the side thereof opposite to said display means, said light detecting means being disposed between said converging lens means and said display means; and
    light intercepting means positioned between said converging lens means and said display means for moving at a displacement between a first position in which external light entering through said converging lens means is prevented from being directed to said display device when said display means is an inoperative condition and when said light detected by said detecting means has an intensity higher than a predetermined level, and a second position in which said external light is directed to said display device when said external light detected by said light detecting means has an intensity lower than said predetermined level.

2. A display apparatus according to claim 1, wherein said light detecting means includes a half mirror positioned on the optical axis of said converging lens means between said converging lens means and said display means with a predetermined angle with respect to said optical axis, and a light detecting element for receiving external light entering through said converging lens means and reflected by said half mirror and for producing an electric signal in accordance with an intensity of the external light received.

3. A display apparatus according to claim 2, wherein said light intercepting means includes a shutter plate located between said half mirror and said display means for displacement between said first position in which it interrupts a path of light between said converging lens means and said display means and a second position in which it does not interrupt the light path.

4. A display apparatus according to claim 1, wherein said light intercepting means includes a reflecting mirror located between said converging lens means and said display means and being movable for displacement between said first position in which the reflection light of said external light reflected by said intercepting means is not directed toward said display means and said second position in which said reflection light is directed toward said display means.

5. A display apparatus according to claim 1, further comprising a driving which includes:

a first driving source for exerting a resilient urging force in a direction to hold said light intercepting means to said first position, and a second driving source for displacing said light intercepting means from said first to said second position against the resilient urging force of said first driving source.

6. A display apparatus according to claim 5, wherein said first driving source includes a spring.

7. A display apparatus according to claim 5, wherein said second driving source includes a solenoid.

8. A display apparatus according to claim 1, wherein said display means is a display element of the light transmissive type including a liquid crystal display cell and a light source for irradiating light to the back of said liquid crystal display cell, and further comprising a thermally protective means for preventing the temperature of said liquid crystal display cell from being raised by heat generated by said light source.

9. A display apparatus according to claim 8, wherein said thermally protective means includes a temperature detecting element for detecting the temperature of said liquid crystal display cell, and a ventilating means operable in response to detection of a temperature higher than a predetermined level by said temperature detecting element for effecting ventilation around said light source.

10. A display apparatus according to claim 8, wherein said thermally protective means includes a member positioned between said light source and said display means for reflecting a heat ray and for transmitting a visible ray therethrough.

11. A display apparatus according to claim 1, wherein said display means is constituted from a liquid crystal display element including a liquid crystal display cell, a light source, and a reflecting mirror positioned between said light source and said liquid crystal display cell for reflecting light from said light source to direct the light to the back of said liquid crystal display cell, and further comprising a thermally protective means for preventing the temperature of said liquid crystal display cell from being raised by heat generated by said light source, said thermally protective means including a member positioned between said light source and said reflecting mirror for reflecting a heat ray from said light source and for transmitting a visible ray therethrough.

12. A display apparatus according to claim 11, wherein said display means further includes a holder for supporting said reflecting mirror and said member thereon, said reflecting mirror and said member being supported in predetermined positions relative to one another.

* * * * *